United States Patent Office 2,937,186
Patented May 17, 1960

2,937,186

ISOTHIOCYANATE COMPOUNDS AND MEANS OF PRODUCING THE SAME

Joseph H. Burckhalter, Lawrence, Kans., and Robert J. Seiwald, San Francisco, Calif., assignors to University of Kansas Research Foundation, a corporation of Kansas No Drawing. Application April 29, 1958
Serial No. 731,084

8 Claims. (Cl. 260—335)

This invention relates to novel fluorescent dyes and to means for producing the same. More particularly, the invention relates to isothiocyanate compounds which may be represented by the formulas (1) [structure with HO-, =O, -COOH, SCN]

(2) [structure with $R_1R_2N$-, =$NR_1R_2X$, -COOH, SCN]

and (3) [structure with $R_1R_2N$-, -$NR_1R_2$(+), -COO(-), SCN]

where $R_1$ represents hydrogen or a lower alkyl group, $R_2$ represents a lower alkyl group, the isothiocyanate group in each case being substituted in the phenyl ring preferably at the position para to the carboxyl group, and X is a halogen radical.

The invention also includes novel intermediate compounds used in the production of the aforementioned compounds, namely, intermediates having the formulas (4) [structure with Acyl-O-, -O-Acyl, C=O, $NH_2$]

and (5) [structure with $R_1R_2N$-, =$NR_1R_2$(+), -COO(-), Y]

where Y is an amino or nitro group, acyl represents a lower fatty acid acyl radical and $R_1$ and $R_2$ have the aforementioned significance.

Prior to the present invention it has been proposed to employ fluorescent dyes as labeling agents in connection with microbiological studies wherein it is of interest to be able to detect the presence of antigens, antibodies and the like in biological specimens. For instance, according to one such practice the dye is conjugated with antibody and the resulting conjugate when contacted with the antigen specific to it provides a discrete particulate or aggregate which can be caused to fluoresce in color under action of ultraviolet light and hence can be readily viewed or observed through a fluorescence microscope. One of the chief difficulties with this procedure, which has prevented greater usage, is that the dye materials employed are extremely unstable and must be used immediately after preparation, especially where such materials become exposed to water as by standing under ordinary atmospheric conditions. Moreover, the preparation of certain of these fluorescing agents has undesirably required the use of the highly toxic war gas known as phosgene which can only be safely handled where elaborate ventilating equipment is available.

In accordance with the present invention these and other difficulties are overcome and there are provided stable fluorescent dye materials which can be kept on hand over long periods and used as desired. The products of the invention can be readily prepared without undue risk of exposure to toxic materials and can be subjected to ordinary conditions of storage and handling without loss of the desired fluorescing and conjugating properties. In addition, the products can be readily mixed with antibody by known procedures, in the ratio of about 0.05 mg. for each milligram of protein, to provide a stable protein conjugate which is visible in fluorescent color under the ultraviolet microscope.

The production of the compounds of the invention comprises reacting an aminofluoran having the formula

[structure with Acyl-O-, -O-Acyl, C=O, $NH_2$]

or an aminorhodamine having in inner salt form the formula

[structure with $R_1R_2N$-, =$NR_1R_2$(+), -COO(-), $NH_2$]

with at least one equivalent of thiocarbonyl halide, preferably thiocarbonyl chloride; where acyl, $R_1$ and $R_2$ have the aforementioned significance. The reaction is favored by the use of a solvent such as water or a non-reactive aqueous or non-aqueous organic solvent such as a lower alkyl ether, cyclic ether, halogenated hydrocarbon, lower aliphatic ketone or lower fatty acid ester. Some examples of suitable organic solvents are acetone, methyl ethyl ketone, dioxane, ethylene dichloride, chloroform, etc. The reaction temperature can be varied widely and is not critical. Conveniently, the reaction can be carried out at room temperature, but it is preferable to operate at higher temperature, especially at reflux temperature, so as to minimize the time required for complete reaction.

The invention is illustrated by the following examples:

Example 1

(a) A solution of 6-aminofluorescein, diacetate ester (5 g.) and 0.6 ml. of concentrated hydrochloric acid in 20 ml. of acetone is added dropwise to a stirred solution of 4 ml. of thiocarbonyl chloride in 20 ml. of acetone at 40° C. and the reaction mixture heated at reflux temperature for four hours. The solvent and excess thiocarbonyl chloride are removed under reduced pressure, the residue is well triturated with 50 ml. of alcohol-free chloroform and collected on a filter, washed with chloroform and dried. The product, 6-isothiocyanatofluorescein, may be represented by the formula

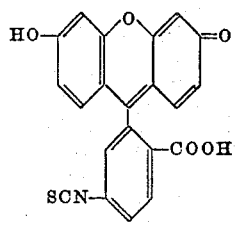

Infra red analysis of the product shows a strong isothiocyanate peak at 2110 cm.$^{-1}$; under ultraviolet light the product has a green fluorescent color.

In the foregoing procedure, the isomeric 5-aminofluorescein, diacetate ester (5 g.) can be substituted as a starting material in which case the product is 5-isothiocyanatofluorescein.

(b) The starting material for Example 1(a) can be prepared by the following method: A suspension of 5.0 g. of finely divided 6-nitrofluorescein, diacetate ester, and one gram of Raney nickel catalyst in 200 ml. of absolute ethanol is hydrogenated at 50 lbs. pressure until hydrogen ceases to be taken up. The reaction mixture is filtered, the filtrate concentrated by evaporation to a volume of about 30 ml. and poured into one liter of ice water. 6-aminofluorescein, diacetate ester, separates as a tan solid and is collected on a filter, washed with water and dried.

Example 2

(a) 9-(5-amino - 2 - carboxyphenyl)-3,6-bis(diethylamino)xanthylium inner salt (1.2 g.) is dissolved in a mixture of 50 ml. of acetone, 10 ml. of water and 0.3 ml. of concentrated hydrochloric acid. The solution is refluxed with 1.2 ml. of thiocarbonyl chloride for 1½ hours and then evaporated under reduced pressure until all the acetone is removed. The product, 9-(2-carboxy-5-isothiocyanatophenyl) - 3,6 - bis(diethylamino)xanthylium chloride, which is contained in the residue, is isolated in inner salt form. This is accomplished by neutralizing the residue with sodium bicarbonate, collecting the product which separates, and drying the collected product after washing with water. The product, 9-(2-carboxy-5-isothiocyanatophenyl)-3,6-bis(diethylamino)xanthylium inner salt, may be represented by the formula

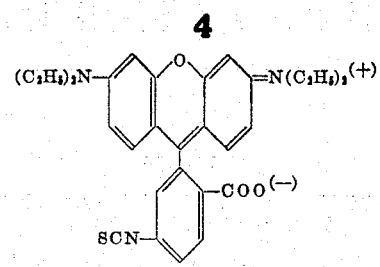

The product exhibits a bright orange red fluorescence and shows a characteristic isothiocyanate peak at 2100 cm.$^{-1}$ in the infra red.

(b) The starting material for Example 2(a) can be prepared by the following method: A solution of 8.25 g. of m-diethylaminophenol in 50 ml. of dry xylene is added dropwise over a period of one-half hour to a rapidly stirred solution of 4.8 g. of 4-nitrophthalic anhydride (prepared by heating 4-nitrophthalic acid for 2 hours at 170–180° C.) in 100 ml. of dry, boiling xylene. Refluxing is continued for 2 hours after which the mixture is cooled to 0° C. and the xylene decanted. The residue is washed with benzene and dissolved in 50 ml. of concentrated hydrochloric acid. The solution is filtered, cooled with ice and adjusted to pH 4 with concentrated ammonium hydroxide. The solid which separates is collected, washed with dilute aqueous hydrochloric acid and dried. The product, 9-2(-carboxy-5-nitrophenyl)-3,6-bis(diethylamino)-xanthylium inner salt has the formula

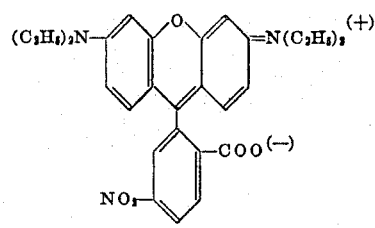

A solution of the 9-(2-carboxy-5-nitrophenyl)-3,6-bis-(diethylamino)xanthylium inner salt (4.0 g.) in 200 ml. of boiling absolute ethanol is filtered and then hydrogenated over 2 g. of Raney nickel at 45 lbs. pressure for 16 hours at a temperature of 50° C. The reaction mixture is filtered and concentrated in vacuo to a thick gum. The residue is dissolved in 100 ml. of normal hydrochloric acid, filtered and the filtrate neutralized with sodium bicarbonate. The resulting oil is extracted with 100 ml. of chloroform, the extract dried, filtered and evaporated to a small volume (about 15 ml.). The resulting concentrate is added dropwise to 100 ml. of petroleum ether with vigorous stirring. The solid product which separates is collected, washed with a small volume of petroleum ether and dried. This product, 9-(5-amino-2-carboxyphenyl)-3,6-bis(diethylamino)xanthylium inner salt, has the formula

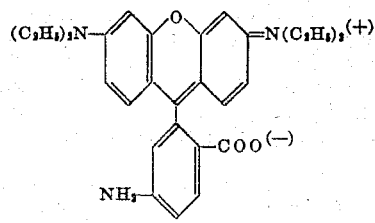

The starting materials for Examples 1(b) and 2(b) are known substances.

While in the foregoing description the invention has been set forth in detail it will be realized by those skilled in the art that considerable variation of such detail can be made without departure from the spirit of the invention.

What is claimed is:

1. As a composition of matter, a member of the class consisting of fluorescein compounds represented by the formula (1) 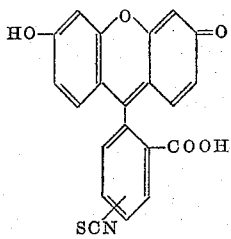

xanthylium halide compounds represented by the formula (2) 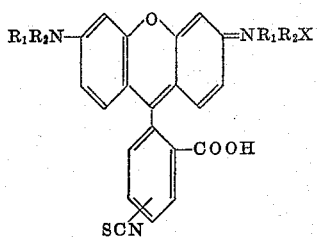

and xanthylium inner salts represented by the formula (3) 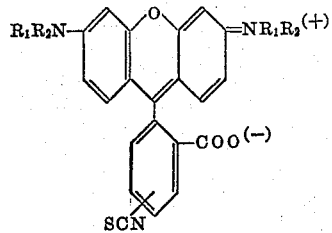

where $R_1$ is a member of the group consisting of hydrogen and lower alkyl, $R_2$ is lower alkyl, and X is a halogen radical.

2. 6-isothiocyanatofluorescein.
3. 5-isothiocyanatofluorescein.
4. 9-(2-carboxy - 5 - isothiocyanatophenyl)-3,6-bis[di-(lower alkyl)amino]xanthylium inner salt.
5. The product of claim 4 wherein said lower alkyl group is an ethyl group.
6. 9-(2-carboxy - 5 - isothiocyanatophenyl)-3,6-bis(diethylamino)xanthylium chloride.
7. 9-(2-carboxy-5-nitrophenyl)-3,6-bis-(diethylamino)-xanthylium inner salt.
8. 9-(5-amino-2-carboxyphenyl)-3,6-bis(diethylamino)-xanthylium inner salt.

References Cited in the file of this patent

UNITED STATES PATENTS

| | | |
|---|---|---|
| 2,042,600 | Hilger | June 2, 1936 |
| 2,153,059 | Eckert | Apr. 4, 1939 |
| 2,219,009 | Eckert | Oct. 22, 1940 |

OTHER REFERENCES

Chemical Abstracts, vol. 50 (1956), col .1383b, an abstract of Y. Hamashinia, Acta Schol. Med., Univ. Kioto, vol. 32, pp. 112–22 (1950); in English.

Chemical Abstracts, vol. 50 (1956), col. 9480a, an abstract of Y. Hamashinia, Acta Schol. Med., Univ. Kioto, vol. 32, pp. 123–137 (1955).

Hamashinia; Acta School Med., Univ. Kioto, Japan, vol. 32, pp. 112 to 122 (1955).

Riggs, J. L.; Masters Thesis, Univ. of Kansas, 1957. University of Kansas, Lawrence, Kansas, pp. 10 and 16.

Lowy et al.; An Introduction to Organic Chemistry, 6th ed., p. 213 and p. 260 (1945).

Chemical Abstracts, vol. 44, col. 2640i (1950), an abstract of Albert H. Coons et al., J. Exptl. Med., 91, pp. 1–13 (1950).